United States Patent
Koster et al.

(10) Patent No.: US 12,268,216 B2
(45) Date of Patent: Apr. 8, 2025

(54) DEVICE AND METHOD FOR REMOVING LEAF LARD FROM SLAUGHTERED ANIMALS

(71) Applicant: MAREL RED MEAT B.V., Lichtenvoorde (NL)

(72) Inventors: Niels Antonio William Koster, Lichtenvoorde (NL); Leonardus Jozephus Antonius Tiggeloven, Lichtenvoorde (NL)

(73) Assignee: MAREL RED MEAT B.V., Lichtenvoorde (NL)

( * ) Notice: Subject to any disclaimer, the term of this patent is extended or adjusted under 35 U.S.C. 154(b) by 29 days.

(21) Appl. No.: 18/035,643

(22) PCT Filed: Nov. 16, 2021

(86) PCT No.: PCT/EP2021/081767
§ 371 (c)(1),
(2) Date: May 5, 2023

(87) PCT Pub. No.: WO2022/106383
PCT Pub. Date: May 27, 2022

(65) Prior Publication Data
US 2023/0397616 A1    Dec. 14, 2023

(30) Foreign Application Priority Data
Nov. 17, 2020    (EP) .................................... 20208088

(51) Int. Cl.
*A22B 5/00* (2006.01)
*B25J 11/00* (2006.01)

(52) U.S. Cl.
CPC ............. *A22B 5/00* (2013.01); *B25J 11/0045* (2013.01)

(58) Field of Classification Search
CPC ........ A22B 5/00; A22B 5/0005; B25J 11/0045
(Continued)

(56) References Cited

U.S. PATENT DOCUMENTS

| 4,030,162 A | 6/1977 | Hubbard |
| 4,993,112 A | 2/1991 | Burnett et al. |

(Continued)

FOREIGN PATENT DOCUMENTS

| CA | 3120849 A1 | 5/2020 |
| CN | 208499882 U | 2/2019 |

(Continued)

OTHER PUBLICATIONS

1 Chinese Office Action from corresponding CN Application No. 202180075959, Apr. 13, 2024.
(Continued)

*Primary Examiner* — Richard T Price, Jr.
(74) *Attorney, Agent, or Firm* — Workman Nydegger

(57) ABSTRACT

A tool for removing leaf lard from an animal carcass includes a mandrel to wind a leaf lard. The mandrel includes a suction cavity with a round opening to engage with a part of the leaf lard. A first air device is located inside the mandrel for aspirating and blowing air into and away from the suction cavity. The mandrel can comprise at least one pushing device to loosen and push away a leaf lard wound around the mandrel, and at least one pushing element located inside and/or in front of the pushing device to be directed underneath a leaf lard. The tool may be used in a method for loosening or removing leaf lard from an animal carcass. The tool may be part of a system for automatic loosening or removing leaf lard from an animal carcass, the system may comprise robot arms, identification system and controlling system.

15 Claims, 3 Drawing Sheets

(58) Field of Classification Search
USPC .......................................................... 452/134
See application file for complete search history.

(56) References Cited

U.S. PATENT DOCUMENTS

| | | | |
|---|---|---|---|
| 5,129,856 A | | 7/1992 | Hahn et al. |
| 5,135,431 A | | 8/1992 | Van Den Nieuwelaar et al. |
| 5,785,588 A | | 7/1998 | Jacobs et al. |
| 5,997,394 A | | 12/1999 | Loseke |
| 6,641,475 B1 | * | 11/2003 | Nielsen ................ A22B 5/0094 452/109 |
| 2023/0157306 A1 | * | 5/2023 | Huinink ............... A22B 5/0041 452/122 |

FOREIGN PATENT DOCUMENTS

| | | |
|---|---|---|
| EP | 0258499 A1 | 3/1988 |
| EP | 0706761 A1 | 4/1996 |
| EP | 0836804 A2 | 4/1998 |
| EP | 1029454 A1 | 8/2000 |
| WO | 0054598 A1 | 9/2000 |
| WO | 2016074993 A1 | 5/2016 |

OTHER PUBLICATIONS

"FrontMatec AiRA RLR Lear Lard Remains Remover" AiRA Robotics, available at https://www.frontmatec.com/en/pork-solutions/clean-line-chill-room/aira-robots/aira-rlr-leaf-lard-remains-remover, retrieved Apr. 21, 2023.

"LLP-1 Leaf Lard Puller", JARVIS, available at https://www.jarvis.co.in/pork-leaf-lard-removal/, retrieved Apr. 21, 2023.

"Frontmatec AiRA Robots | RLR Leaf lard remains remover" video available at https://www.youtube.com/watch?v=dVfiEomzUBQ, Frontmatec, Youtube, retrieved Apr. 21, 2023.

"Leaf Lard Removal, Leaf Lard Puller, Air," KENTMASTER, available at https://kentmaster.com/product.asp?CatID=2&CtgID=149&PrdID=M-8, retrieved Apr. 21, 2023.

"Insight", Marel Red Meat B.V., Meat Processing, vol. 9, As Early As Jan. 1, 2020, 11 pages.

International Search Report from corresponding PCT Application No. PCT/EP2021/081767, Feb. 16, 2022.

Extended European Search Report from corresponding EP Application No. 20208088.3-1005, May 17, 2021.

Brochure: "Hog Leaf Lard Puller Model LLP-1", Jarvis Products Corporation, available at https://web.archive.org/web/20201023210045/https://jarviscanada.com/brochure/LLP-1.pdf, retrieved May 2, 2023.

Third Party Observation from corresponding PCT Application No. PCT/EP2021/081767, Mar. 15, 2023.

"Removedor de Tejido Magro FLR Mark 2, Manual de Funcionamiento", MPS Meat Processing Systems, Oct. 1, 2006, 55 pages.

Canadian Office Action from Corresponding Canadian Patent Application No. CA3201304, Aug. 17, 2023.

* cited by examiner

DEVICE AND METHOD FOR REMOVING LEAF LARD FROM SLAUGHTERED ANIMALS

FIELD OF THE INVENTION

The invention relates to a device, a method and a system for loosening or removing the layer of abdominal fat or leaf lard (fat) from a slaughtered animal or a part thereof, for instance a pig, of which the abdominal cavity has been opened beforehand.

BACKGROUND

At many abattoirs processes after slaughtering of animals such as pigs include opening the carcasses, removing the intestines and removing the abdominal fat layer also called leaf lard before further cutting e.g. cutting the carcass halves into sections. Removing the leaf lard was initially performed by hand which is intensive and repeated work. Handheld devices such as described in U.S. Pat. No. 5,997,394 (Jarvis) and EP1029454 A1 (BVS) and mechanically controlled devices such as described in U.S. Pat. No. 5,785,588 (Stork) have each contributed to stepwise reducing the workload on the workers.

More specific, U.S. Pat. No. 5,785,588 describes a device for removing the layer of abdominal fat or leaf fat from a slaughtered animal or a part thereof, for instance a pig, of which the abdominal cavity has been opened beforehand, which device has a gripping element for gripping the layer of abdominal fat or leaf fat in addition to a pulling element for pulling loose the layer from the abdominal wall, which gripping element includes at least one suction aperture. In preference the pulling element includes a rotatably drivable winding mandrel which is provided with a suction aperture, which winding mandrel is guided for winding up during rotary driving the layer of abdominal fat or leaf fat gripped by the suction aperture.

However, the described devices do not satisfy the requirements in the production today which in an increasing number of abattoirs become more automatic by including robots working with the carcass and parts thereof. Problems to be solved are e.g. speed of loosening or removing leaf lard, quality of the removal e.g. how much lard is left in the abdominal wall, how the leaf lard is handled when removed from the abdominal wall of the carcass, how difficult it is to separate the leaf lard from the removing device and also producing a more stable device to reduce the risk that the device fails in the process e.g. by not providing a secure fastening of the leaf lard to the device.

DESCRIPTION OF THE INVENTION

It may be seen as an object of the present invention to provide a device in the form of a tool, a system and a method, which overcomes one or more of the problems mentioned above. It may be a further object of the present invention to provide an alternative to the prior art.

A first object of the invention relates to a tool for loosening or removing leaf lard from at least a part of an animal carcass, the tool comprises a winding mandrel configured to wind a leaf lard around it, the mandrel comprising
  a suction cavity inside the mandrel and with a rounded opening arranged on an outer surface of the mandrel, the suction cavity being configured to engage with a part of the leaf lard,
  at least one first air device located inside the mandrel for alternately aspirating and blowing air into and away from the suction cavity to respectively pull the engaged part of the leaf lard into the suction cavity and blow off the engaged part of the leaf lard from the suction cavity.

By winding mandrel is meant that the mandrel during operation is capable of rotating around its own longitudinal central axis, and when engaged with an end of a leaf lard located in an abdominal wall of a slaughtered and opened animal e.g. in a half carcass this leaf lard will be wound around i.e. rolled around the rotating mandrel.

The mandrel has a suction cavity inside the mandrel and, with an opening arranged on an outer surface of the mandrel making it possible to aspirate air into the mandrel hereby making an under pressure and sucking action in a volume inside the suction cavity and in front of the opening, such that leaf lard close to and/or in contact with the mandrel can be drawn towards the mandrel and/or held firmly by the mandrel before and/or during winding the leaf lard on the mandrel.

The opening of the suction cavity may be round, such as circular or oval. A round opening of the suction cavity has the advantage that the leaf lard will not be caught by edges as may happen for e.g. a suction cavity which is straight and with angular edges.

The border or edge making the opening of the suction cavity may be slightly protruding, the result of this is a better contact established with leaf lard when the mandrel engages with the leaf lard.

The at least one first air device located inside the mandrel may be at least one tube located in the inner part of the mandrel from the base end to the suction cavity, and may be connected to a compressor/pump located outside the base end of the mandrel, this compressor being capable of making a vacuum in the first air device by aspirating air away through the suction cavity. Aspirating air through the suction cavity may be performed such as before and/or when the mandrel engages with a leaf lard and vacuum may also be obtained during at least a part of the process of winding up the leaf lard around the mandrel. The compressor may also be blowing air into the first air device which air may be pressed out through the cavity opening and away from the suction cavity to make a zone of increased pressure around the opening and thus blow off the mandrel-engaged part of the leaf lard from the mandrel. Hereby pressed air may help release the leaf lard from the suction cavity and also provide a lifting effect between the leaf lard and the mandrel where leaf lard around the mandrel may blown up like a balloon, the result of this is the leaf lard comes off the mandrel very easy and no sticking effect is seen.

The tool may further comprise:
  at least one pushing device configured to loosen and push away a leaf lard wound around the mandrel and/or
  at least one pushing element located inside and/or in front of the pushing device and configured to be directed underneath a leaf lard wound around the mandrel.

The pushing device may be a ring-formed device capable of being pushed from a base end of the mandrel towards the front end of the mandrel when a leaf lard wound around the mandrel is to be pushed off. An advantage of this is the pushing effect makes it easier to remove the leaf lard quickly from the mandrel compared to unwinding the leaf lard prior to removal or the leaf lard by gravity is let off the mandrel. A piston may be located at the base end of the mandrel and be connected to the pushing device and be controlled by a controlling system controlling the tool for loosening or removing leaf lard and the piston in the process of loosening or removing a leaf lard from an animal carcass.

At least one pushing element may be located in connection with the mandrel, such as inside and/or in front of the pushing device. The at least one pushing element may be connected to a first ring, and it may be this first ring together with the pushing elements which can be located inside of a second ring forming the ring-shaped pushing device. The at least one pushing element may be moved from the base end of the mandrel towards the front end when a leaf lard wound around the mandrel is to be pushed off from the mandrel. The pushing device together with the at least one pushing element may as a single unit be moved from the mandrel base end towards the mandrel front end to push on the leaf lard wound around the mandrel. The at least one pushing element may have any form such as protruding in the area closest to the mandrel, hereby being capable of being directed underneath the leaf lard wound around the mandrel and improving the process when the leaf lard is to be pushed off the mandrel.

A second aspect of the invention relates to another possibility of solving the problems described above. This aspect relates to a tool for removing leaf lard from at least a part of an animal carcass, the tool comprises a winding mandrel configured to wind a leaf lard around it, the tool further comprises:

At least one pushing device configured to loosen and push away a leaf lard wound around the mandrel, At least one pushing element located inside of the pushing device and configured to be directed underneath a leaf lard wound around the mandrel.

The tool described as a second aspect of the invention may further comprise:

a suction cavity located inside the mandrel and with a round opening arranged on an outer surface of the mandrel, the suction cavity being configured to engage with a part of the leaf lard, and/or at least one first air device located inside the mandrel for alternately aspirating and blowing air into and away from the suction cavity to respectively pull the engaged part of the leaf lard into the suction cavity and blow off the engaged part of the leaf lard from the suction cavity.

Features of the first and second aspect may be similar in construction and function and may each be combined with one or more features of the invention as described below.

Concerning both first and second aspects of the invention, the tool may comprise at least one pushing device which is an outer ring or is connected to an outer ring and the at least one pushing element is connected to an inner ring, which can slide or rotate inside of the outer ring. An advantage of this is the pushing element can be located tight to the mandrel and rotate together with the mandrel during winding and unwinding, and still the pushing element can be connected to the pushing device such that when the pushing device is directed from the base end of the mandrel towards the front end of the mandrel and in the opposite direction, the pushing element is moved together with the pushing device. There is thus no need to stop the mandrel rotation before initiating the pushing operation. Further, a tight connection between the pushing device and the pushing element also secures the leaf lard will be located at the area around the mandrel and not on the wrong side of the base end of the mandrel and will not be caught between the mandrel and the pushing device.

The tool may further comprise a clamping mechanism located in the suction cavity and being capable of clamping at least a part of the leaf lard aspirated into the suction cavity. The clamping mechanism may be ring-shaped or have a similar form as the opening of the suction cavity, it may be located inside the suction cavity and preferably close to the opening of the suction cavity. The clamping mechanism may function by movement such as a linear movement from an open position where no clamping is performed to a closed position where clamping of leaf lard aspirated into the suction cavity can be performed. An advantage of such a clamping mechanism is a secured hold of the leaf lard during winding the leaf lard around the mandrel and tearing the leaf lard from the abdominal wall of the carcass. The clamping mechanism may also secure the leaf lard to the mandrel until it is to be delivered in a pre-determined location e.g. in a collection vessel possibly located close to the place where the leaf lard is removed from the abdominal wall.

The clamping mechanism may be controlled mechanically or by air. When controlled by air a pressure chamber may be located below the clamping mechanism inside of the suction cavity. By filling the pressure chamber with air, the clamping mechanism is pushed towards the suction opening to close the suction cavity and when the pressure chamber is emptied the clamping mechanism is no longer pushed towards the suction opening and the clamping mechanism will return to an open position of the suction cavity.

The mandrel of the tool may have an overall conical shape with a larger base perimeter and a smaller front perimeter and wherein the suction cavity is located closer to the front end of the mandrel than to the base end of the mandrel, such as in the front quarter part of the mandrel. The front end of the mandrel is the free part, and the base end of the mandrel is where the tool may be connected to holding and controlling parts, such as a robot arm and compressor/pump. An advantage of the conical shape of the mandrel is the leaf lard wound around the mandrel is able to push off the mandrel due to the smaller dimension at the front end.

The mandrel may have an incurvature of the surface next to the suction cavity opening in the direction towards the base of the mandrel. Such an incurvature length, depth and location may be designed in accordance to the form and size of abdominal walls and the ribs therein of animal carcasses in which the tool is to be used. The incurvature may follow the anatomical features of the abdominal walls during at least a part of the process of winding leaf lard around the mandrel. An advantage of the incurvature is a closer contact between the mandrel and the leaf lard which is being wound around the mandrel. The closer contact results in a better contact and thus a reduced risk the leaf lard is not wound around the mandrel.

The mandrel may have a deflection of the surface on the opposite side of the location of the incurvature. Such a deflection may be designed in accordance to the form and size of abdominal walls and the ribs therein of animal carcasses in which the tool is to be used. The deflection may follow the anatomical features of the abdominal walls during at least a part of the process of winding leaf lard around the mandrel. An advantage of the deflection is a closer contact between the mandrel and the leaf lard which is being wound around the mandrel. The closer contact results in a better contact and thus a reduced risk the leaf lard is not wound around the mandrel.

The mandrel may at the outer surface comprise engaging members such as spikes configured to engage with the leaf lard. The engaging members may be located more or less randomly over the mandrel surface or in a pattern, such as in rows along the length of the mandrel. The engaging members may each be pointed and may in overall be straight or turned e.g. with the tip turned towards the front end of the mandrel. An advantage of engaging members is a more solid grip is made between the mandrel and the leaf lard to remove from an animal carcass. An advantage of turning the tip ends towards the mandrel front is when the leaf lard wound around the mandrel is to be removed from the mandrel, such as to be pushed off the mandrel, where this process will be easier.

The mandrel may further comprise apertures in the surface, such as apertures between the engaging members and/or at the tip of the engaging members. These apertures may be connected to an air device such that air may be aspirated from the outside and into the engaging members prior to and while a mandrel is in touch with a leaf lard that is to be wound around a mandrel. The aspiration may be continued at least for a part of the time during winding the leaf lard around the mandrel. In this function an advantage of the engaging member is the grip between the mandrel and the leaf lard is increased thus reducing the risk of not having the leaf lard wound around the mandrel. The apertures may further be used such that air is blown from the inside of the mandrel and out of the apertures in the process where the leaf lard is to be removed from the mandrel. Hereby the leaf lard wound around the mandrel is slightly lifted and the removal becomes much easier e.g. when the pushing device and/or the pushing element is further used to loosen and push onto the leaf lard.

The mandrel may also comprise at least one rail recess located along the length of the mandrel. A rail recess may be a recess or lane within a part of the mandrel surface having a bottom part and a side along each edge of the bottom part. The bottom part of the rail recess may be substantially parallel to the overall surface of the mandrel, hereby the height of the sides may be substantially equal along the length of the rail recess. However, the bottom part of the rail recess may also be substantially parallel to a longitudinal axis of the mandrel, hereby the height of the sides of the rail recess may decrease from the base end of the mandrel towards the front end of the mandrel. Preferably the rail recess is for guiding the pushing element along the mandrel and e.g. increasing the capability of the pushing element to be directed underneath the leaf lard wound around the mandrel. The mandrel may have at least two recesses, which each may be located about 90 degrees away from a center line of the suction cavity opening, the center line being parallel to a center line or central axis from the base end to the front end of the mandrel. Hereby the mandrel may comprise a rail recess on each side of the mandrel e.g. mirrored in relation to the suction cavity. An advantage of the rail recess is the pushing element is easier directed underneath the leaf lard wound around the mandrel and the position of the pushing element is stabilized during pushing of the leaf lard from the mandrel.

The at least one pushing element may be located at least partly in the at least one rail recess and being configured to be entered beneath and/or to push on a leaf lard wound around the mandrel. Such a pushing element may be inclined towards the mandrel surface in the direction towards the front end of the mandrel. Hereby the pushing element may be higher at the end located towards the base end of the mandrel and lower at the end located towards the front end of the mandrel. The inclination of the pushing element may be e.g. about 45 degree. An advantage of an inclined pushing element is the pushing element is easier directed underneath the leaf lard wound around the mandrel. This advantage is further increased when an inclined pushing element is located in a rail recess as described above.

If the bottom part of the rail recess is substantially parallel to the overall surface of the mandrel rail recess, then the at least one rail recess may preferably be located along the mandrel surfaces in areas without the incurvature and the deflection, if one or both of these are present.

The surface of the mandrel may be substantially symmetrical around a plane separating the mandrel along its length in two halves and also separating the suction opening of the suction cavity into two halves.

A further aspect of the invention relates to a system for automatic loosening or removing leaf lard from at least a part of an animal carcass, the system may comprise:

At least one robot arm comprising at least one tool as described herein,

An identification system configured to identify the location of a part of an animal carcass and/or the location of a leaf lard to be removed or partly removed from a part of an animal carcass, A processing system configured to receive and process information of at least a location of an animal, a location of an animal part, and/or a location of a leaf lard connected to at least a part of an animal carcass, A controlling system being in communication with at least the processing system and the at least one robot arm, the controlling system being configured to control the at least one robot arm with the tool for loosening or removing leaf lard to engage with a leaf lard located in the abdominal wall of at least a part of an animal carcass, wind the mandrel such that the leaf lard is wound around the mandrel hereby loosening the main part of the leaf lard from the abdominal wall or removing the leaf lard from the abdominal wall of the carcass, and remove the tool from the leaf lard leaving the leaf lard connected to a small part of the abdominal wall or directing the loose-leaf lard to a pre-determined area.

The system may be an automatic robot system and each component thereof is preferably suitable for functioning at abattoirs. At abattoirs the carcasses or carcass halves after opening and evisceration may be directed further in the processes hanging in the hind legs in overhead conveyors and being transported with head down. Leaf lard located in the abdominal wall may be loosened or removed from the half carcasses hanging in the position with head down, such as by using the system described herein.

The at least one robot arm may be a robot arm with at least three degrees of freedom and capable of being controlled individually by the controlling system and based on the information received by the processing system.

The identification system may comprise a vision system e.g. a number of cameras located to identify the location of a part of an animal carcass and/or the location of a leaf lard to be removed or partly removed from a part of an animal carcass. The identification system may also be capable of controlling the mandrel is removed properly from a leaf lard wound around the mandrel and whether the leaf lard is left attached to the abdominal wall if that is predetermined or the leaf lard is delivered to a predetermined location.

The processing system such as a processor is preferably configured to receive and process multiple pieces of information received from e.g. the identification system of at least a location of an animal, a location of an animal part, and/or a location of a leaf lard connected to at least a part of an animal carcass, and the processing system is preferably capable of processing these information in relation to determining the most optimal solution for connecting the mandrel of the tool to the leaf lard and determine the solution of winding the leaf lard around the mandrel as well as releasing the mandrel from the leaf lard.

The controlling system such as a controller is preferably in communication with at least the processing system. However, the processing system and controlling system may also be a single system having both functionalities. The controlling system controls the at least one robot arm in accordance to the optimal solution determined by the processing system. The controlling system controls the at least one robot arm to perform the method as described herein for loosening or removing a leaf lard from an abdominal wall of an animal carcass.

The system may comprise at least two robot arms, each with at least one tool as described herein. The robot arms are controlled by the controlling system to drive the mandrels in at least partly mirrored directions to loosen or remove leaf lard from e.g. two half carcasses being a left and a right half carcass part from e.g. an animal, such as two half carcasses from one animal. Two robot arms working on two halves of carcasses from e.g. one animal may work simultaneously in the mirrored process though one robot arm may be leading in the process such that the tool of this robot arm engages with the leaf lard before the tool of the other robot arm engages with the leaf lard of the other half carcass.

In the system the at least one robot arm may each comprise two tools of the type as described herein.

Another aspect of the invention relates to a method for loosening or removing leaf lard from at least a part of an animal carcass with the use of a tool as described herein, the method comprises at least the steps of
  a) Contacting the mandrel of the tool with one end part of a leaf lard located in at least a part of an animal carcass,
  b) Winding the mandrel and simultaneously moving the mandrel along the leaf lard such that the leaf lard is loosened from the carcass part and wound around the mandrel until at least a main part, or the entire part of the leaf lard is wound around the mandrel.
  c) Disengaging the mandrel and the wound-around leaf lard.

The method is preferably an automatic method for loosening or removing leaf lard from at least a part of an animal carcass. In such an automatic method, the method may be performed by a system as described herein.

In the method the leaf lard may be loosened and left connected to the abdominal wall. The connection between the leaf lard and the abdominal wall may be as little as possible to secure the leaf lard stays connected e.g. until a predetermined time when the leaf lard may be removed e.g. removed by hand. An advantage of leaving the leaf lard connected to the abdominal wall is when a veterinarian is to control the carcass then there is no doubt the leaf lard is from the carcass under inspection. The leaf lard attached to the abdominal wall can be removed after the inspection.

When contacting the mandrel of the tool with one end part of a leaf lard located in at least a part of an animal carcass, this may be at the lower end of the leaf lard in half carcasses hanging in the hind leg.

In this method the mandrel of the tool is contacted with one end part of a leaf lard located in at least a part of an animal carcass. Preferably the contact and engagement is performed in the end of the leaf lard which is close to the diaphragm before this is removed from the carcass, in this end the leaf lard may be pointed. There is no need of cutting free this leaf lard end from the abdominal wall before the mandrel contacts the leaf lard.

During winding of the mandrel and simultaneously moving the mandrel along the leaf lard, the leaf lard is loosened from the abdominal wall of the carcass part and the leaf lard is wound around the mandrel until at least a main part or the entire part of the leaf lard is wound around the mandrel. Thus, a main part of the leaf lard is wound around the mandrel if the leaf lard is to be left in the carcass. The entire leaf lard is preferably wound around the mandrel if the leaf lard is to be removed from the carcass, or at least the entire leaf lard is loosened from the abdominal wall making it possible to remove the leaf lard from the abdominal wall.

When loosening or removing leaf lard e.g. from half carcasses hanging in their hind leg, the tool may be moved upwards from the inclined end of the leaf lard where the mandrel engages with the leaf lard. The position of the mandrel may be e.g. at an angle of about 45 degree to horizontal when in the starting position where the mandrel engages with the leaf lard and with the front end of the mandrel pointing downwards. The angle may become smaller during the winding process and may be e.g. 40-15 degree to horizontal in a stop position—and still with the front end of the mandrel pointing downwards—where the mandrel is to be removed from the carcass with or without the leaf lard wound around it. Moving the mandrel along the leaf lard imposes some stress on the leaf lard and releasing it from the abdominal wall, however the main force to releasing the leaf lard from the abdominal wall comes from the winding of the mandrel.

Disengaging the mandrel and the wound-around leaf lard may include two possibilities. The mandrel can be removed from the leaf lard wound around the mandrel, this is e.g. the case when the leaf lard is left connected to the abdominal wall after the disengagement. Alternatively, the leaf lard can be removed from the mandrel, this is e.g. the case when the leaf lard is removed from the abdominal wall and located elsewhere such as in a preselected location.

The method may comprise during step a) securing the leaf lard to the mandrel by suction and/or clamping, such as suctioning a minor leaf lard part into the suction cavity of the mandrel and/or clamping a minor leaf lard part in the suction cavity of the mandrel. Suction is created by aspirating air through the first air device and/or second air device. The forces created by vacuum in the first air device is capable of drawing/pulling a part of the leaf lard towards and/or into the suction cavity. When part of the leaf lard is in the suction cavity the second air device may activate the clamping mechanism and enter this into a closed position that clamp the leaf lard inside the suction cavity, hereby creating a solid connection between the mandrel and the leaf lard.

The method may comprise during the disengagement of step c) blowing air into the suction cavity to release the leaf lard from the inside such as releasing the leaf lard from the clamping mechanism. Blowing air into the suction cavity may be performed by blowing air through the first air device. A lifting off process may also be performed where air is directed underneath the leaf lard i.e. in between the surface of the mandrel and the wound-around leaf lard. This air for lifting may be air directed through the first air device.

The lifting off process may be further strengthened if apertures are present in the mandrel surface between the engaging members and/or are located at the tip of the engaging members, hereby air may be blown out through such apertures and increasing the lifting off process or be the sole process for lifting off the leaf lard by air. A third air device may be located inside the mandrel making it possible to blow air out through the apertures. Such a third air device may also be used for aspirating air from outside into the mandrel and using the apertures to increase the connection between a leaf lard and the mandrel.

The method may further include during step c) pushing off the wound around leaf lard from the mandrel, where the pushing device is directed from the base end of the mandrel towards the front end of the mandrel and the pushing device is pushing onto the leaf lard. If the leaf lard is to be left connected to the abdominal, the mandrel such as the entire tool may during this pushing process be not moving or may be directed in a direction opposite to the forward direction of the pushing device when pushing to the leaf lard. If the leaf lard is removed from the abdominal wall, the tool may be moved towards a predetermined location before and/or while the pushing device is being directed forward i.e. directed from the base end of the mandrel towards the front end of the mandrel. The pushing device is returned to the base end of the mandrel when its forward movement is finished.

The method may further comprise during step d) pushing off the wound around leaf lard from the mandrel, the at least one pushing element is directed together with the pushing device from the base end of the mandrel towards the front end of the mandrel and is performing a lifting process of the leaf lard wound around the mandrel. The pushing element preferably has an inclined design where a small leading dimension can be directed underneath the leaf lard wound around the mandrel when the pushing device and the pushing element(s) are being directed forward i.e. from the base end of the mandrel towards the front end of the mandrel. As the inclined pushing element is directed forward it is directed further underneath the wound-around leaf lard and hereby lifts the leaf lard from the mandrel such that the pushing device is capable of pushing with a larger force to the leaf lard and such that the leaf lard will not stick between the pushing device and the mandrel.

The method may be an automatic method executed by the system described elsewhere herein to loosen or remove leaf lard from at least a part of an animal carcass.

DETAILED DESCRIPTION OF THE DRAWINGS

Figure 1:
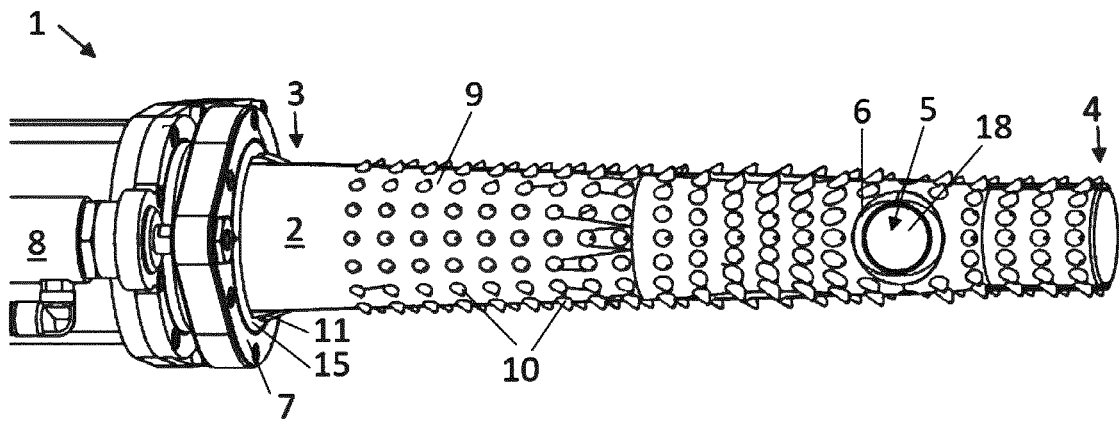
FIG. 1 illustrates a first perspective view of a tool for removing or loosening a leaf lard.

FIG. 1 illustrates a tool 1 for removing or loosening a leaf lard. A longitudinal mandrel 2 with a base end 3 and a front end 4 has a suction cavity 5 with an opening 6. Inside the opening a clamping mechanism 18 is positioned. At the base end 3 of the mandrel a pushing device 7 is located encircling the mandrel 2. Illustrated is part of a piston 8 capable of directing the pushing device 7 from the base end 3 towards the front end 4. The surface 9 of the mandrel 2 is illustrated with engaging members 10. The mandrel 2 is conically shaped with a larger perimeter at the base end 3 than at the front end 4. Engaging members 10 are illustrated as pointed spikes which are askew and with the tips of the spikes pointing towards the front end 4 of the mandrel 2. Illustrated is also the location of a pushing element 11 inside a ring-shaped part of pushing element 15.

Figure 2:
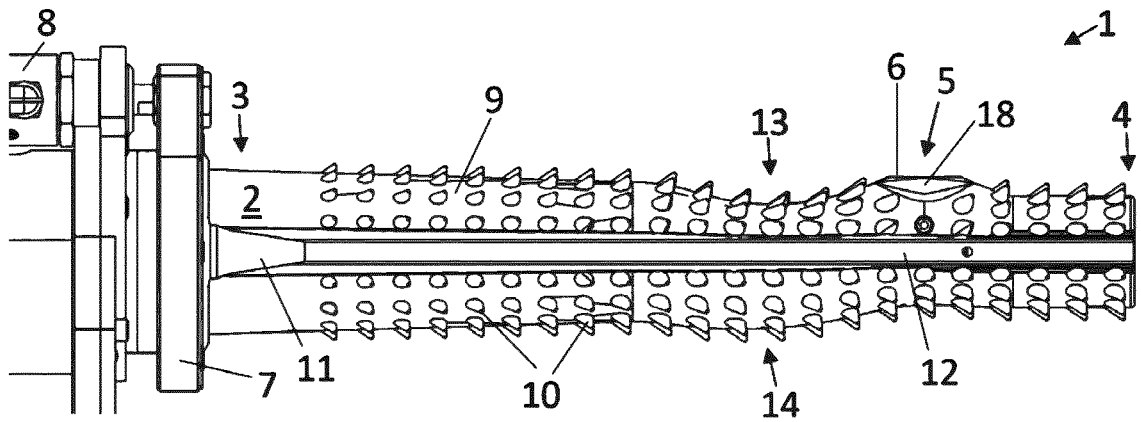
FIG. 2 illustrates a second perspective view of a tool for removing or loosening a leaf lard.

FIG. 2 illustrates a second side view of a tool for removing or loosening a leaf lard. The tool 1 is seen from a side when related to the position in FIG. 1. In the mandrel 2 a suction cavity 5 with an opening 6 is seen where the opening is closed by a clamping mechanism 18. At the base end 3 a pushing device 7 is located. Inside the pushing device 7 is a pushing element 11, where at part of the pushing element 11 is located in a rail recess 12 located from the base end 3 to the front end 4 of the mandrel 2 in a region where the suction opening 6 is not located. The piston 8 is capable of directing the pushing device 7 and the pushing element 11 from the base end 3 of the mandrel 2 and towards the front end 4 of the mandrel 2 where the pushing element 11 is guided in and by the rail recess 12 such that the inclined pushing element 11 can be directed underneath a leaf lard (not shown) wound around the mandrel 2. Illustrated is also an incurvature 13 of the mandrel 2 located close to the opening 6 of the suction cavity 5. The incurvature 13 is located on the side—in the longitudinal direction—of the opening 6 which is towards the base end 3 of the mandrel 2. On the opposite side of the mandrel 2 and just opposite to the incurvature 13 a deflection 14 is illustrated. Also illustrated is that the suction opening 6 is slightly protruding from the overall boundary of the mandrel 2 illustrated with an overall tapered design.

Figure 3:
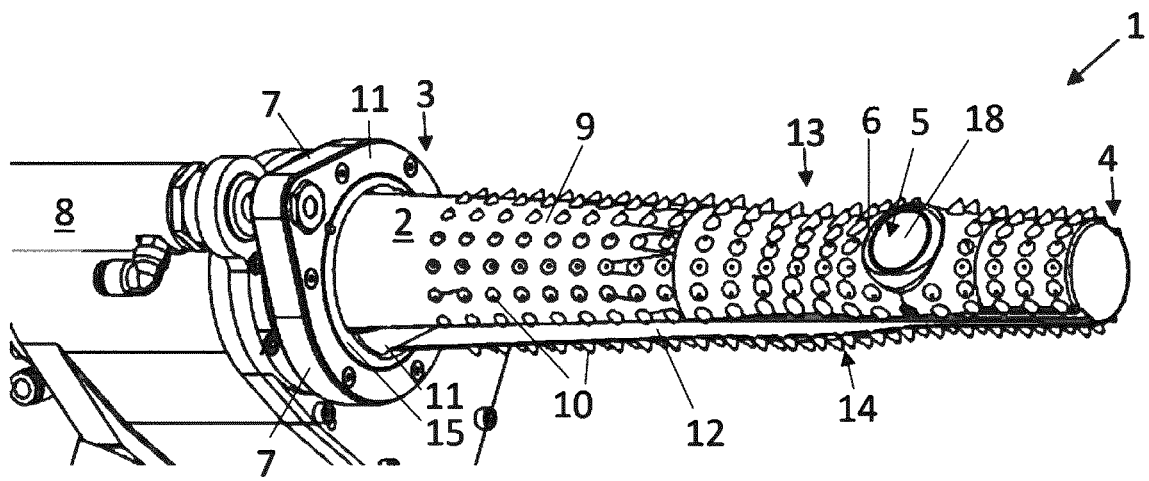
FIG. 3 illustrates a third perspective view of a tool for removing or loosening a leaf lard.

FIG. 3 illustrates a third side view of a tool for removing or loosening a leaf lard. Features are as described in relation to FIGS. 1 and 2. Focus in this figure is on the pushing device 7 and the pushing element 11. The pushing device 7 encircles a ring-shaped part 15 of the pushing element 11. The ring-shaped part 15 of the pushing element 11 can rotate inside of the ring-shaped pushing device 7 during the rotation of the mandrel 2. Hereby during rotation of the mandrel 2, the ring-shaped part 15 of the pushing device 7 rotates together with the mandrel 2, while the pushing element 11 of the pushing device 7 does not rotate.

Figure 4:
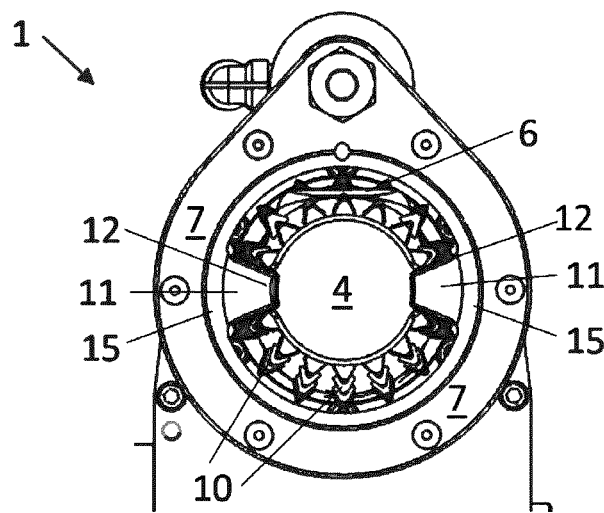
FIG. 4 illustrates a perspective view from the front of a tool for removing or loosening a leaf lard.

FIG. 4 illustrates a front view of a tool for removing or loosening a leaf lard. Illustrated is the front end 4 of the mandrel 2 and a look from this point towards the base end 3 of the mandrel 2. Two rail recesses 12 are illustrated opposite of each other on each longitudinal side of the mandrel 2 and outside the region of the opening 6 of the suction cavity (not visible). Engaging members 10 are illustrated being located in rows along the longitudinal direction of the tapered mandrel 2. In the rail recesses 12 pushing elements 11 are located and surrounding the base end of the mandrel 2 is the ring-shaped part 15 of the pushing device 7 and the pushing element 11, which together are controlled by the piston 8 such that the pushing device 7, the pushing elements 11 and the ring-shaped part 15 can be directed from the base end 3 towards the front end 4 and returned again.

Figure 5:
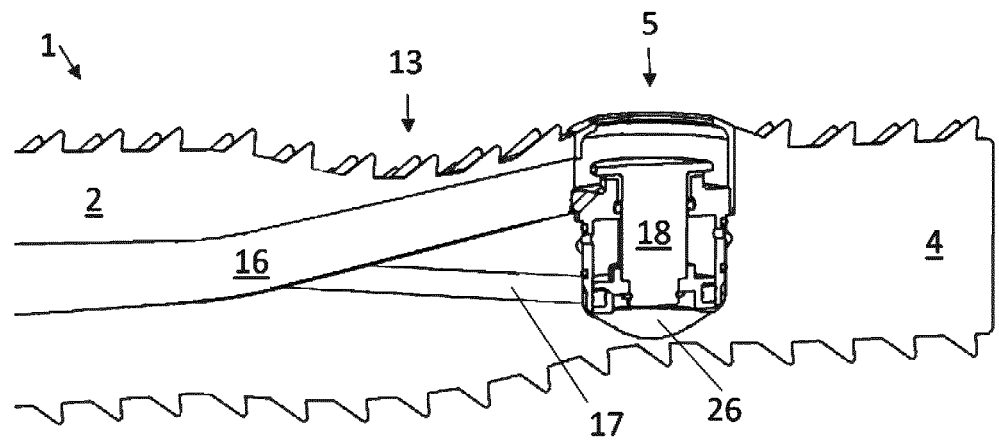
FIG. 5 illustrates a longitudinal section through a tool for removing or loosening a leaf lard and where the clamping mechanism is in a closed position.

FIG. 5 illustrates a longitudinal section through a part of a tool 1 for removing or loosening a leaf lard. Inside the mandrel 2 is seen a first air device 16 and a second air device 17 located from the base end 3 to the suction cavity 5. The first air device 16 is controlled to aspirate leaf lard into the suction cavity 5 and to blow the leaf lard out of the suction cavity 5. The second air device 17 controls the function of the clamping mechanism 18, which is shown in a closed position. The air control is performed by directing air through the second air device 17 towards the suction cavity 5 and into the pressure chamber 26 to direct the clamping mechanism 18 located inside the suction cavity 5 towards the opening 6 of the suction cavity 5, hereby getting the clamping mechanism 18 into a closed position. Air by aspirating in the second air device 17 may be used to get the clamping mechanism 18 in an open position or air flow towards the pressure chamber is stopped.

Figure 6:
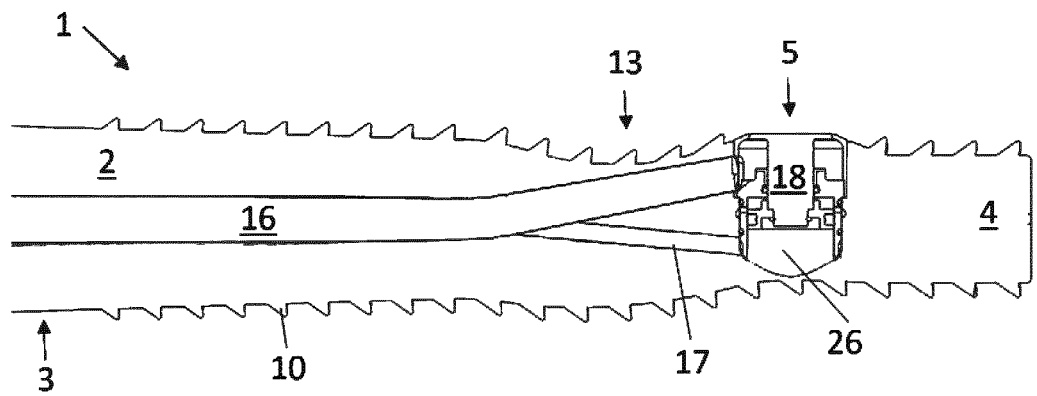
FIG. 6 illustrates an enlarged view of part of the longitudinal section through a tool for removing or loosening a leaf lard where the clamping mechanism is in an open position.

FIG. 6 illustrates an enlarged view of part of the longitudinal section through a tool for removing or loosening a leaf lard. Features are as described in relation to FIG. 5. In this figure the clamping mechanism 18 is shown in an open position where the upper part of the clamping mechanism 18 is located away from the suction opening 6 making it possible to aspirate leaf lard into the suction cavity 5. The pressure chamber 26 is 'small' or in its starting position as no air is directed through the second air device 17 toward the pressure chamber 26.

Figure 7:
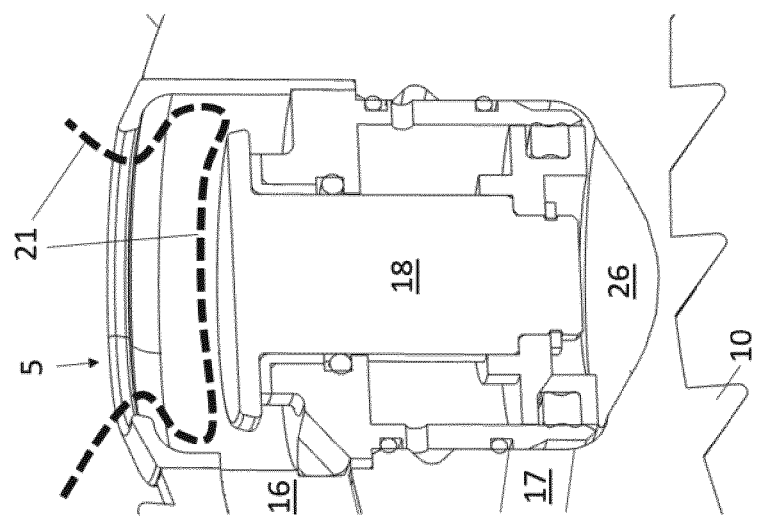
FIG. 7 illustrates the position of leaf lard aspirated into the suction cavity while the clamping mechanism is in an open position.

FIG. 7 illustrates a suction cavity 5 in an open position where the clamping mechanism 18 is located away from the suction opening 6 a section of a leaf lard 21 is illustrated aspirated into the suction cavity. When the clamping mechanism 18 is directed towards the suction opening 6 with the leaf lard 21 in this position, the leaf lard 21 will be clamped inside the suction cavity 5. Shown is also the pressure chamber 26 in its starting position before air is directed through the second air device 17 into the pressure chamber 26.

Figure 8:
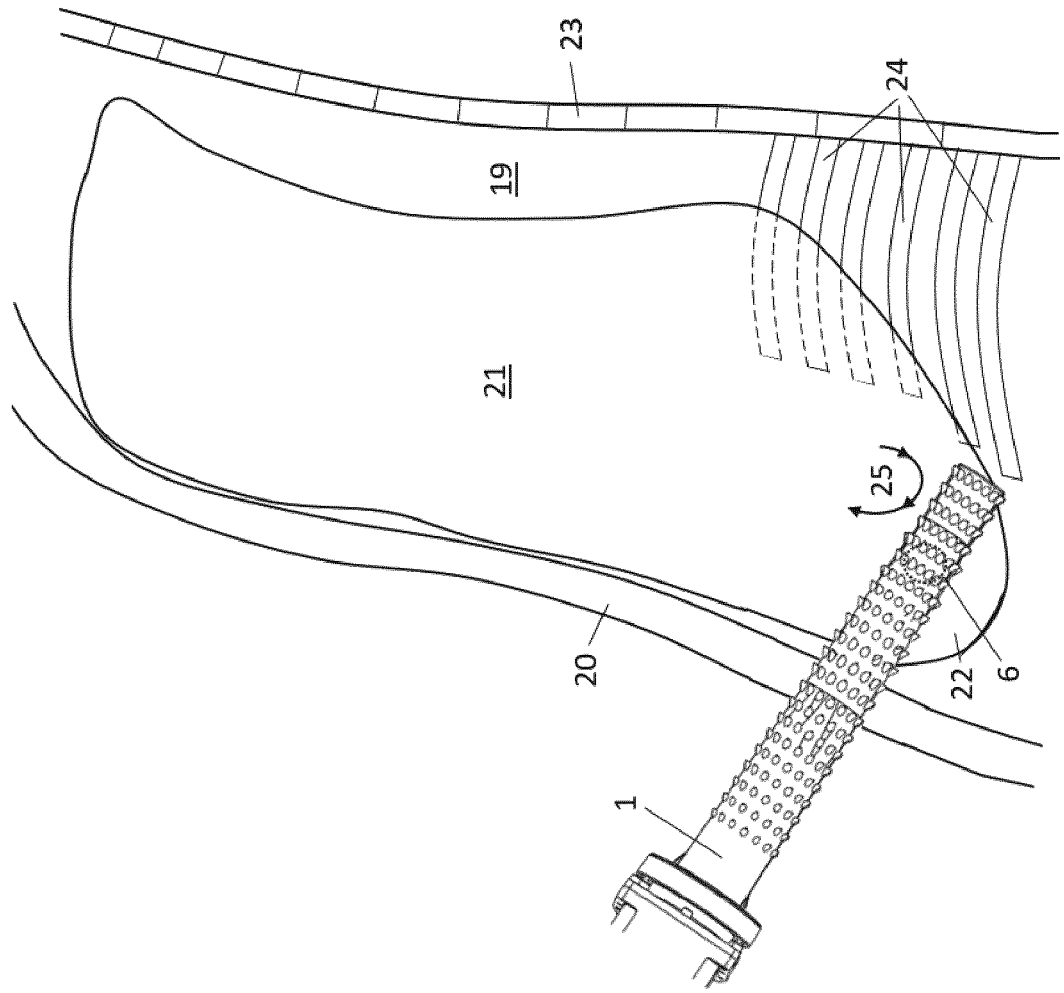
FIG. 8 illustrates a possible location of the tool when engaging with a leaf lard.

FIG. 8 illustrates a possible location of the tool when engaging with a leaf lard. The figure illustrates part of an animal carcass including an abdominal wall 19 with spinal column 23, ribs 24 where part of some are located behind the leaf lard 21, the cut open abdominal wall 20 and the leaf lard 21 located in the abdominal wall 19. This illustration may simulate a part of a half pig carcass hanging in its hind leg i.e. with head down. A tool 1 as described herein is directed towards the leaf lard 21 and with the front end of the tool 1 pointing partly to the ground. The opening 6 of the suction cavity is illustrated with a dotted line to indicate it is located in the tool 1 at the side directed towards the leaf lard 21. The opening 6 is engaged with the leaf lard 21 in the pointed end 22 of the leaf lard 21, which is the lower part of the leaf lard 21 for carcass parts hanging in hind legs. The arrows 25 indicate the turning direction of the mandrel of the tool 1 for winding the leaf lard 21 around the mandrel.

It should be understood that the detailed description and specific examples, while indicating embodiments of the invention, are given by way of illustration only, since various changes and modifications within the spirit and scope of the invention will become apparent to those skilled in the art from this detailed description.

The invention claimed is:

1. A tool for loosening or removing leaf lard from at least a part of an animal carcass, the tool comprising a winding mandrel configured to wind a leaf lard around the winding mandrel, the mandrel comprising:
   a suction cavity located inside the mandrel and with a rounded opening arranged on an outer surface of the mandrel, the suction cavity being configured to engage with a part of the leaf lard,
   at least one first air device located inside the mandrel for alternately aspirating and blowing air into and away from the suction cavity via the rounded opening to respectively pull the engaged part of the leaf lard into the suction cavity and blow off the engaged part of the leaf lard from the suction cavity.

2. The tool according to claim 1, further comprising:
   at least one pushing device configured to loosen and push away a leaf lard wound around the mandrel and/or
   at least one pushing element located inside and/or in front of the pushing device and configured to be directed underneath a leaf lard wound around the mandrel.

3. The tool according to claim 1, wherein the tool further comprising a clamping mechanism located in the suction cavity and being capable to clamp at least a part of the leaf lard aspirated into the suction cavity.

4. The tool according to claim 1, wherein the mandrel has an incurvature of the surface next to the opening of the suction cavity in the direction towards a base end of the mandrel.

5. The tool according to claim 4, wherein the mandrel has a deflection of the surface on the opposite side of the location of the incurvature.

6. The tool according to claim 1 wherein the mandrel at its outer surface comprises engaging members such as spikes configured to engage with the leaf lard.

7. The tool according to claim 1, wherein the mandrel comprises at least one rail recess located along the length of the mandrel, such as at least two rail recesses each located about 90 degrees away from a center line of the opening of the suction cavity, the center line being parallel to a center line from a base end to a front end of the mandrel.

8. The tool according to claim 7, wherein at least one pushing element is located at least partly in the at least one rail recess, wherein the at least one pushing element is configured to be entered beneath and/or to push on a leaf lard wound around the mandrel, and wherein the pushing element is inclined towards the mandrel surface in the direction towards the front end of the mandrel.

9. A method for loosening or removing leaf lard from at least a part of an animal carcass with a tool according to claim 1, the method comprising the steps of:
   a) contacting the mandrel with one end part of a leaf lard located in at least a part of an animal carcass,
   b) winding the mandrel and simultaneously moving the mandrel along the leaf lard such that the leaf lard loosened from the carcass part and wound around the mandrel until at least a main part or the entire part of the leaf lard is wound around the mandrel,
   c) disengaging the mandrel and the wound-around leaf lard.

10. The method according to claim 9, wherein during step a) securing the leaf lard to the mandrel by suction and/or clamping, such as suction a minor leaf lard part into the suction cavity of the mandrel and/or clamping a minor leaf lard part at the suction cavity of the mandrel.

11. The method according to claim 9, wherein during step c) pushing off the wound around leaf lard from the mandrel, a pushing device is directed from a base end of the mandrel towards a front end of the mandrel and the pushing device is pushing onto the leaf lard and at least one pushing element is directed together with the pushing device from the base end of the mandrel towards the front end of the mandrel and is hereby performing a lifting process of the leaf lard wound around the mandrel.

12. A tool for loosening or removing leaf lard from at least a part of an animal carcass, the tool comprising a winding mandrel configured to wind a leaf lard around the winding mandrel, the tool further comprising:

at least one pushing device configured to loosen and push away leaf lard wound around the mandrel, at least one pushing element located inside and/or in front of the pushing device and configured to be directed underneath leaf lard wound around the mandrel.

13. The tool according to claim 12, further comprising:

a suction cavity located inside the mandrel and with a rounded opening arranged on an outer surface of the mandrel, the suction cavity being configured to engage with a part of the leaf lard, and/or at least one first air device located inside the mandrel for alternately aspirating and blowing air into and away from the suction cavity via the rounded opening to respectively pull the engaged part of the leaf lard into the suction cavity and blow off the engaged part of the leaf lard from the suction cavity.

14. A system for automatic loosening or removing leaf lard from at least a part of an animal carcass, the system comprising:

a) at least one robot arm comprising at least one tool as described in claim 1, b) an identification system configured to identify the location of a part of an animal carcass and/or the location of a leaf lard to be removed from a part of an animal carcass, c) a processing system configured to receive and process information of at least a location of an animal, a location of an animal part, and/or a location of a leaf lard connected to at least a part of an animal carcass, d) a controlling system being in communication with at least the processing system and the at least one robot arm, the controlling system being configured to control the at least one robot arm with the tool for loosening or removing leaf lard to a. engage with a leaf lard located in the abdominal wall of at least a part of an animal carcass, b. wind the mandrel such that the leaf lard is wound around the mandrel hereby loosening a main part of the leaf lard from the abdominal wall or removing the leaf lard from the abdominal wall of the carcass, and c. remove the tool from the leaf lard leaving the leaf lard connected by a small part to the abdominal wall or directing loose leaf lard to a deposition area.

15. The system according to claim 14, comprising at least two robot arms each with at least one tool and/or at least one robot arm each with two tools, which robot arms are controlled by the controlling system to drive the mandrels in similar directions or in mirrored directions to remove leaf lard from two half carcasses being from similar animal parts or from a left and a right half carcass part from an animal, such as two half carcasses from one animal.

\* \* \* \* \*